Jan. 18, 1955 J. SMISKO ET AL Re. 23,925
COUPLING
Original Filed Sept. 8, 1947
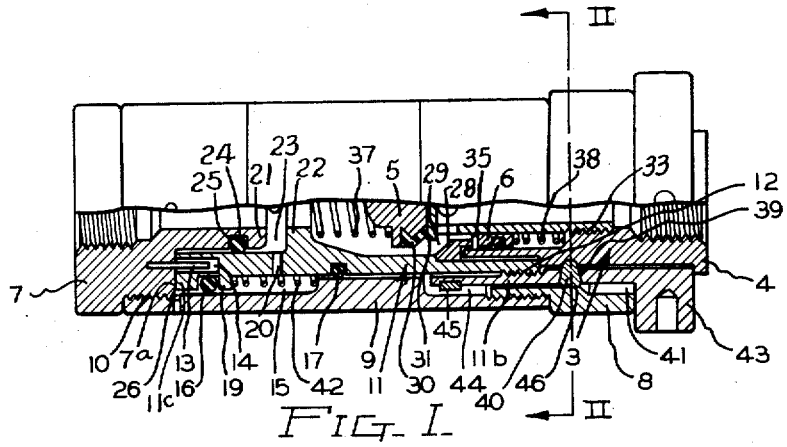
FIG. I.
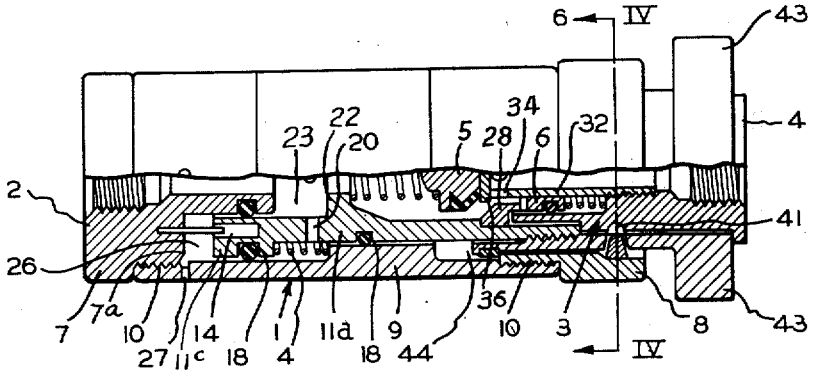
FIG. III.
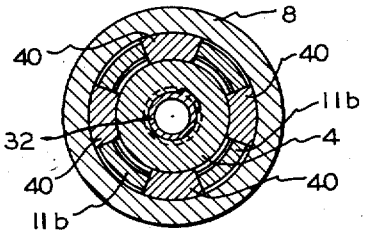
FIG. II.
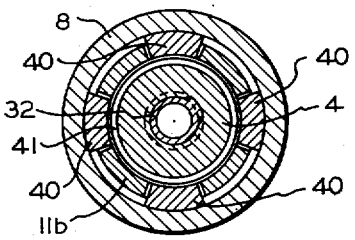
FIG. IV.
Inventor
JOHN SMISKO and
STANLEY H. ZEEB
By Beaman & Patch
Attorneys.

United States Patent Office

Re. 23,925

Reissued Jan. 18, 1955

23,925

COUPLING

John Smisko and Stanley H. Zeeb, Jackson, Mich., assignors to Aeroquip Corporation, Jackson, Mich., a corporation of Michigan Original No. 2,463,326, dated March 1, 1949, Serial No. 772,782, September 8, 1947. Application for reissue August 4, 1950, Serial No. 177,784

6 Claims. (Cl. 284—18)

Matter enclosed in heavy brackets [ ] appears in the original patent but forms no part of this reissue specification; matter printed in italics indicates the additions made by reissue.

This invention relates to couplings for fluid conductors and particularly to such as are employed to conduct incompressible, or substantially incompressible, fluids and which comprise essentially a pair of hollow body parts each containing a self-sealing valve which is maintained in the open position when a coupling connection between the two body parts is made, but which closes automatically when the coupling connection is broken, so as to prevent the escape of fluid from the conductors.

An object of the invention is to provide an improved coupling of the above-described character which permits limited elongation, in the longitudinal direction, of the fluid passageway opened up between the two coupling body parts while the valves therein are open and this prior to an automatic breaking apart of the coupling connection, whereby the said connection can be automatically broken upon either of the coupling body parts being subjected to a predetermined pulling force exerted in the direction of the longitudinal axis of the coupling and away from the other coupling part and this while providing for a transfer flow of fluid displaced in one direction, during the time that the said limited elongation takes place, and in the opposite direction, during the time that a corresponding contraction is effected, such fluid transfer ensuring that the volume of fluid within the coupled conductors remains constant under all conditions.

Thus, an important object of the invention is to provide an improved coupling connection for a pair of coupling parts incorporating self-sealing valves which permits a transfer flow of the fluid to take place incident to the connection and disconnection of the fluid coupling parts and which at the same time permits automatic disconnection of the parts to take place upon the occurrence of an externally applied strain exerted between the coupled parts in the direction of the longitudinal axis thereof.

These and other objects and advantages residing in the construction and use of a coupling in accordance with the invention will appear from a consideration of the following description and claims in conjunction with the accompanying drawings, in which Fig. I is a half-longitudinal sectional and half elevational view of one form of coupling in accordance with the invention, showing the coupling parts in the completely coupled condition, Fig. II is a transverse section on the line II—II of Fig. I, Fig. III is a similar view to Fig. I, but showing the coupling parts ready for separation, and Fig. IV is a transverse section on the line IV—IV of Fig. II.

In carrying the invention into effect in one convenient manner as illustrated in the drawings a coupling for connecting together two fluid pipe lines is provided consisting of a tubular body part 1, adapted for attachment at one end 2 to one of the fluid pipe lines (not shown), and another tubular body part 3 adapted for attachment at one end 4 with one end of the other fluid pipe lines and itself, that is this tubular body part 3, being capable of being telescoped within the end of the other body part 1 remote from the end 2 of the latter. The body part 1 and the body part 3 when telescoped together, to effect a coupling of the two pipe lines together, are co-axial with one another and by the provision of self-sealing valves 5 and 6 accommodated within the body parts 1 and 3 respectively serve in the coupled condition, to afford a straight-through passageway for the flow of pressure fluid through the two pipe lines.

The body part 1 is of composite construction and consists of an end collar 7 united with another end collar 8 through the medium of an elongated intermediate sleeve 9, such uniting of these three parts together being conveniently accomplished by screw-threading 10 whereby the three parts are rigid with one another. This body part 1 accommodates, for limited longitudinal sliding movement therein, an inner elongated sleeve 11 which is itself composed of two co-axial portions 11a and 11b connected with one another by the screw-threading 12. The inner sleeve 11 is guided for longitudinal sliding movement with respect to the outer body part 1 by a series (only one of which is shown) of circumferentially spaced axial pins 13 secured upon the end collar part 7 and extending into axial bores 14 in the corresponding end of the inner sleeve part 11a. The latter is formed to provide an annular chamber 15 between itself and the outer body part 1, which chamber 15 forms a fluid compensating chamber and is sealed in a fluid tight manner at one end by a sealing ring 16 and at its opposite end by a sealing ring 17, these two sealing rings being conveniently accommodated within annular grooves 18 upon the outer periphery of the inner sleeve part 11a and the sealing ring 16 being provided upon a piston part 19 of the latter which piston part has a piston-like action within the annular fluid compensating chamber 15.

Communication between the annular chamber 15 and the interior of the body part 1 is affected by means of one or more radially extending openings 20 in the sleeve part 11a and by the inner end 21 of the end collar 7 being always axially spaced from an inwardly directed radial boss portion 22 of the inner sleeve portion 11a, whereby to provide an annular gap 23 which has permanent communication with the interior of the body part 1 and the aforesaid annular chamber 15 via the intermediate openings 20.

The sleeve 11a is sealed on its interior with respect to the end collar 7 by a sealing ring 24 conveniently accommodated within an annular groove 25 on the collar part 7.

On the side of the sealing ring 16 remote from the annular chamber 15 the united parts 9 and 7 of the body part 1 are formed to provide an airspace 26 which includes one or more holes 27 capable of functioning as air-bleed holes for bleeding the air in this space to the outer atmosphere.

The inner sleeve part 11a carries a valve seat 28 in the form of a ring having an interior bevel surface 29 adapted when the coupling parts are disconnected to have fluid-tight seating engagement with respect to a correspondingly formed sealing ring 30 upon the outer periphery of the one self-sealing valve 5, which latter has a flat disc-shape end surface which, when the coupling parts are brought together, and during the time that the valves 5 and 6 are maintained in the open position as shown in Figure I, has contact with a correspondingly shaped flat end wall 31 of a sleeve 32 fixedly secured within the body 3, as by means of the screw-threading 33. This sleeve 32 is formed at one end with a series of circumferentially placed ports 34 which serve to permit a free flow of the pressure fluid between the two pipe lines when the two valves are opened during the coupled condition of the coupling parts but which ports 34 are sealed against the escape of fluid from the coupling part 3, when the coupling parts are disconnected, by means of the valve 6 which is in the form of a sleeve axially slidable upon the outside of the fixed sleeve 32, the valve sleeve being provided at one end with an annular sealing ring 35 adapted to have fluid tight sealing contact with an annular seating surface 36 provided at the corresponding end of the sleeve 32.

The valve 5 is normally resiliently biased into the closed position with respect to its seat [29] *28* by a coil spring 37 whereas the valve sleeve 6 is also normally biased into its closed position with respect to the sleeve 32 and the seat 36 by means of the coil spring 38.

The end part 11b of the inner sleeve 11 is formed with a series of circumferentially spaced arcuate slots 39 in each of which a correspondingly shaped detent segment 40 is accommodated for radial sliding movement to cause the detent segments either to be projected radially outwards or radially inwards, depending upon whether these detent segments are positioned opposite to, or are displaced axially away from, an annular recess 41 formed at the outer end and on the interior of the collar part 8 of the outer body part.

The inner sleeve 11 is resiliently biased by the coil spring 42 into the contracted position as shown in Figure I in which the end 11c of the sleeve portion 11a is brought to rest against an internal annular [should] *shoulder* 7a on the end collar 7 and in which a flange 43 at the outer end of the sleeve part 11b may also be brought to rest against the corresponding end of the collar 8 of the outer body part.

As above stated, the inner sleeve 11 is composed of two coaxial sleeve portions, 11a and 11b, connected with each other by the screw-threading 12. At its inner end the sleeve portion 11b extends into an annular space 44, formed between the sleeve 9 of the outer body part 1 and the other inner sleeve portion 11a, and within this annular space 44 the corresponding end of the sleeve portion 11b is fitted with a stop-ring 45. The construction is such that the sleeve portion 11b can be rotated relatively to its sleeve portion 11a to cause the end flange 43 to be displaced axially beyond the end collar 8 and thereby position the detent segments 40 opposite the recess 41, stop-ring 45 serving to limit the extent of this axial displacing movement of the sleeve portion 11b to the amount required. Having thus effected this manual adjustment of the sleeve portion 11b, it is possible to insert the coupling part 3 into the extended sleeve portion 11b from the outer end of the latter, so that the annular groove 41 is brought opposite the detent segments 40. Such manual adjustment is required to be effected when it is desired to re-couple the two body parts after the same have been automatically uncoupled due to a predetermined external force having been applied to one or the other of the coupling body parts in the direction of the longitudinal axis thereof and in opposition to the other coupling body part.

It will be understood that when this automatic uncoupling takes place, the spring 42 is immediately operative to restore the inner sleeve part 11 to its inwardly contracted position as shown in Figure I. Consequently, the detent segments 40 have to be displaced axially to lie opposite the recess 41 before the coupling body part 3 can be again connected with the coupling body part 1. When this connection has taken place, the flange 43 which was rotated anti-clockwise to effect a resetting of the detent segments 40 opposite the recess 41 is rotated clockwise to cause the sleeve portion 11b to be returned to its normal connected position with the sleeve portion 11a and at the same time the detent segments 40 will be cammed radially inwards into firm locking engagement with the annular groove 41 by the engagement of the outer peripheral portions of these detents with the interior surface 46 of the end collar 8. In this position the two coupling body parts are held coupled together with their valves open (the valves being forced open against the action of their springs and the fluid pressure prevailing in the fluid conductors as the flange 43 is rotated clockwise to complete the coupling connection). Such coupling connection is effective for all normal operating conditions but provides that in the event of one or the other of the coupled body parts being subjected to an abnormal or pre-determined external force applied in the direction of the longitudinal axis of the coupling and in opposition to the other body part, the coupling connection effected by the cammed engagement of the detent segments 40 with the groove 41 can be automatically broken as above described. A coupling construction as provided in accordance with the invention is useful therefor for application to fluid pressure pipe lines which require to be coupled together between a tractor or prime mover and a trailer or farm implement since in such connection, provision must be made to protect the coupled pipe lines against fracture or damage upon an excessive external force or strain being set up between the tractor and trailer, as for example, when the trailer (which may be a farm implement), encounters an unsurmountable obstruction.

When the over-all length of the coupled body parts is extended to the position shown in Figure III, the volume of the pressure fluid within the fluid passageway opened up between the coupled body parts and extending into the fluid pipe lines connected thereto is kept constant due to the fact that a free transfer of the pressure fluid into the thus extended passageway is permitted to take place from the fluid compensating chamber 15. A reverse fluid transfer action takes place when the coupling body parts are subjected to contraction to the position as shown in Figure I, and it will be self-understood that the consequential piston like action within the annular compensating chamber 15 is rendered possible by the provision made for the bleeding of air from the air-space 26 behind the piston 19 or for the introduction of air into this space from the outer atmosphere.

While the invention has been described with reference to one particular embodiment, it is to be understood that other forms of the invention are possible, and that in particular, constructional changes may be made to suit particular requirements or practical considerations without departing from the scope of the appended claims.

Having thus described our invention what we desire to secure by Letters Patent and claim is:

1. [A] *In a* coupling for *inter-connecting* a pair of fluid conductors *and permitting disconnection by elongation of the coupling, with attendant increase in the length of a passageway opened up through the coupling upon connection,* [comprising] a first hollow body part adapted for connection with a said fluid conductor, a second hollow body part adapted for connection with the other fluid conductor and capable of having telescopic engagement with the said first body part, [the latter] *said first body part* being constituted by an outer sleeve and an inner sleeve slidable axially with respect to the outer sleeve and [forming] *defining* a fluid [compensating] chamber between each other, means [for] limiting said axial sleeve movement in either direction, resilient means [for] maintaining said two sleeves normally in a condition in which [the] one sleeve is contracted upon the other sleeve and the over-all length of the two sleeves, and hence of the body part constituted thereby, is a minimum, the interior of *this last mentioned body part* [the latter] having free and permanent communication with said fluid [compensating] chamber, self-sealing valve means in each of said body parts, *said body parts having fluid flow passages therethrough for defining said opened-up passageway, said passages having a combined fluid capacity of pre-determined amount when said body parts are fully connected,* [and] connecting means cooperable with and between the two body parts to effect a connecting thereof together in the telescoped condition of the one body part [while] *and* permitting the said over-all length to be increased to a maximum upon the coupled body parts being subjected to a predetermined external force exerted in the direction of the longitudinal axis of the coupled body parts, whereupon the said connection becomes ineffective and the two body parts are automatically capable of *disconnection, said increase in length being attendant with an increase in the amount of the said combined liquid capacities of said passages in the fully connected condition of said body parts, the amount of said increase being pre-determined, said chamber having a fluid capacity at least equal to said increase, and means decreasing the fluid capacity of said chamber upon elongation of the coupling an amount substantially equal to said increase* [separation from one another].

2. A coupling construction as claimed in claim 1 wherein said connecting means comprise detent members carried by said inner sleeve for radial movement inwards or outwards with respect thereto and to a groove on said second body part, the latter telescoping into one end of said inner sleeve and to a recessed portion at one end of said outer sleeve, the construction and arrangement being such that when the detents are positioned opposite said recess they are free to move outwards from engagement with the said groove so as thereby to permit automatic separation of the two body parts whereas when the inner sleeve is moved axially to displace said recess from the detents the latter are cammed inwards into engagement with said grove so as thereby to hold the two body parts coupled together.

3. A coupling construction as claimed in claim 1 wherein said inner sleeve is resiliently biased axially into its normally axially contracted position with respect to the outer sleeve.

4. A coupling construction as claimed in claim 1 wherein said inner sleeve comprises an end portion axially adjustable with respect to an adjacent portion of the sleeve, said end sleeve portion carrying said connecting means and said adjustment serving to set the connecting means for fresh inter-locking engagement after the coupling has been broken.

5. In a coupling of the kind comprising a pair of hollow body parts having valves which close to seal their respective body parts when the latter are disconnected, *and permitting disconnection by elongation of the coupling, with attendant increase in the length of a passageway opened-up through the body parts upon connection,* means providing for displacement of liquid incident to the coupling and uncoupling operations, said means comprising a sleeve [in] *on* one said body part telescopically mounted with respect to said *one* body part and forming therewith an enclosed annular liquid compensating chamber, said sleeve including a main sleeve portion and an end sleeve portion adjustable axially with respect to said main sleeve portion, passage means between said chamber and the one said body part providing for a free transfer flow of part of the liquid to take place between the chamber and said *one* body part, *said body parts having fluid flow passages therethrough defining said opened-up passageway when the body parts are fully connected, said passages having a combined fluid capacity of predetermined amount when said body parts are fully connected* [whereby to provide a compensation effect for said liquid displacement], connector means on said end sleeve portion adapted releasably to connect said sleeve with the other coupling body part to permit both to move axially in unison relatively to the said one body part with the two body parts slidably coupled together by said connector means and the said valves open, *said axial movement being attendant with an increase in said fluid capacity, the amount of said increase being pre-determined,* [and] means limiting the extent of said unitary relative axial movement, said connector means normally holding the two body parts against separation but being adapted for automatic release to free the body parts for separation upon the occurrence of a predetermined externally applied strain between the two parts producing relative movement of *said parts and elongation of the coupling* [the latter] to the limit of extent of said movement limiting means in *the* automatic *disconnecting* [coupling separating] direction, *said compensating chamber having a liquid capacity at least equal to said increase in the fluid capacity of said opened up passageway, and means for decreasing the fluid capacity of said chamber an amount substantially equal to said increase.*

[6. In a coupling of the kind comprising a pair of hollow body parts having valves which close to seal their respective body parts when the latter are disconnected, means providing for displacement of liquid incident to the coupling and uncoupling operations, said means comprising a sleeve in one said body part telescopically mounted with respect to said body part and forming therewith an enclosed annular liquid compensating chamber, passage means between said chamber and the one said body part providing for a free transfer flow of part of the liquid to take place between the chamber and said body part whereby to provide a compensation effect for said liquid displacement, said sleeve carrying the valve and corresponding valve seat of its respective body part, connector means adapted releasably to connect said sleeve with the other coupling body part to permit both to move axially in unison relatively to the said one body part with the two body parts slidably coupled together by said connector means and the said valves open, and means limiting the extent of said unitary relative axial movement, said connector means normally holding the two body parts against separation but being adapted for automatic release to free the body parts for separation upon the occurrence of predetermined externally applied strain between the two parts producing relative movement of the latter to the limit of extent of said movement limiting means in automatic coupling separating direction.]

7. In a coupling of the kind comprising a pair of hollow body parts having valves which close to seal their respective body parts when the latter are disconnected, *and permitting disconnection of said body parts by elongation of the coupling and attendant increase in the length of a liquid flow passageway opened-up through the connected body parts,* means providing for displacement of liquid incident to the *connecting and disconnecting* [coupling and uncoupling] operations, said means comprising a sleeve [in] *on* one said body part telescopically mounted with respect to said one body part and forming therewith an enclosed annular liquid compensating chamber, said sleeve including a main sleeve portion and an end sleeve portion adjustable axially with respect to said main sleeve portion, [the latter] *said main sleeve portion* carrying the self-sealing valve of its respective body part, passage means between said chamber and the *said* one [said] body part providing for a free transfer flow of part of the liquid to take place between the chamber and said body part, *said body parts having liquid flow passages which combine to form said opened-up passageway, the combined liquid capacities of said passages being of predetermined amount in the connected condition of said body parts* [whereby to provide a compensation effect for said liquid displacement], connector means on said end sleeve portion adapted releasably to connect said sleeve with the other coupling body part to permit *said sleeve and other body part* [both] to move axially in unison relatively to the said one body part, with the two body parts *being* slidably coupled together by said connector means and the said valves *being* open, said sleeve being manually adjustable to dispose said connector means in position to permit connection of the two coupling parts, [and] means limiting the extent of said unitary relative axial movement, *said axial movement being attendant with an increase in the liquid capacity of said opened-up passage-way, the amount of said increase being predetermined,* said connector means, when in operation, normally holding the two body parts against separation but being adapted for automatic release to free the body parts for [separation] *disconnection* upon the occurrence of a predetermined externally applied strain between the two parts [producing relative movement of the latter to the limit of extent of said movement limiting means in an automatic coupling separating direction], *said chamber having a liquid capacity at least equal to said increase, and means decreasing the fluid capacity of said chamber an amount substantially equal to said increase.*

References Cited in the file of this patent or the original patent

UNITED STATES PATENTS

| | | |
|---|---|---|
| 1,960,529 | Dodge | May 29, 1934 |
| 2,297,548 | Fox et al. | Sept. 29, 1942 |
| 2,386,270 | Samiran | Oct. 9, 1945 |
| 2,425,500 | Wiggins | Aug. 12, 1947 |
| 2,436,206 | Deming | Feb. 17, 1948 |
| 2,441,363 | Krueger | May 11, 1948 |
| 2,453,741 | Bopp | Nov. 16, 1948 |
| 2,505,245 | Hollerith | Apr. 25, 1950 |
| 2,509,444 | Mitchell | May 30, 1950 |